May 13, 1952 F. W. JACKSON ET AL 2,596,691
SAFETY DEVICE FOR LIQUID SUPPLY SYSTEMS
Filed Sept. 3, 1946 2 SHEETS—SHEET 1
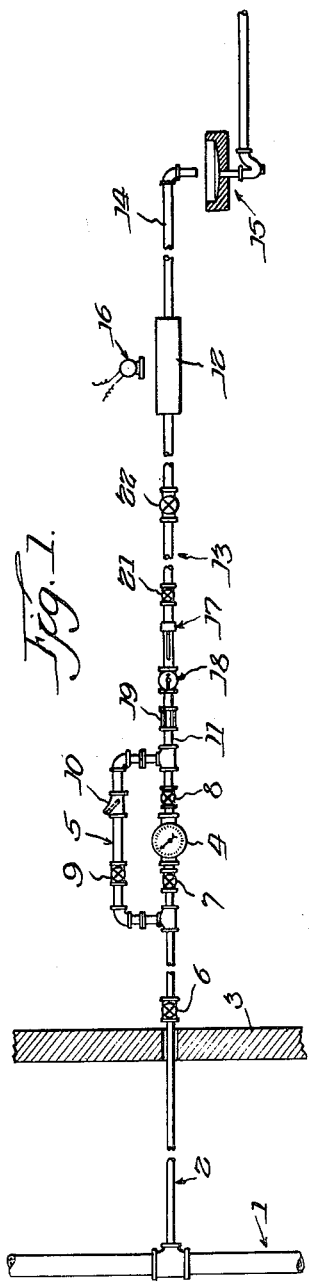
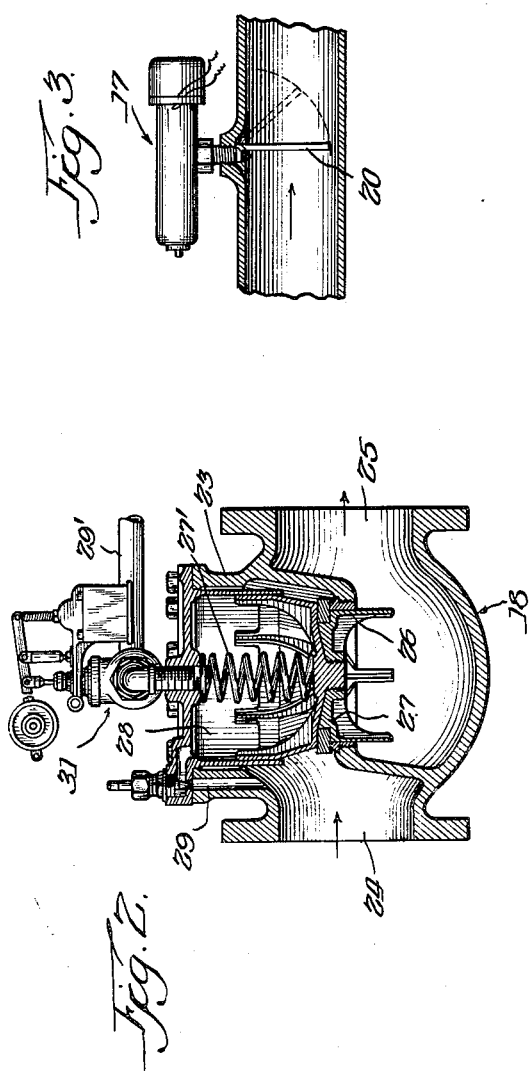
Inventors:
Frank W. Jackson, &
Harry M. Macey
By Shee & Shee
Attys

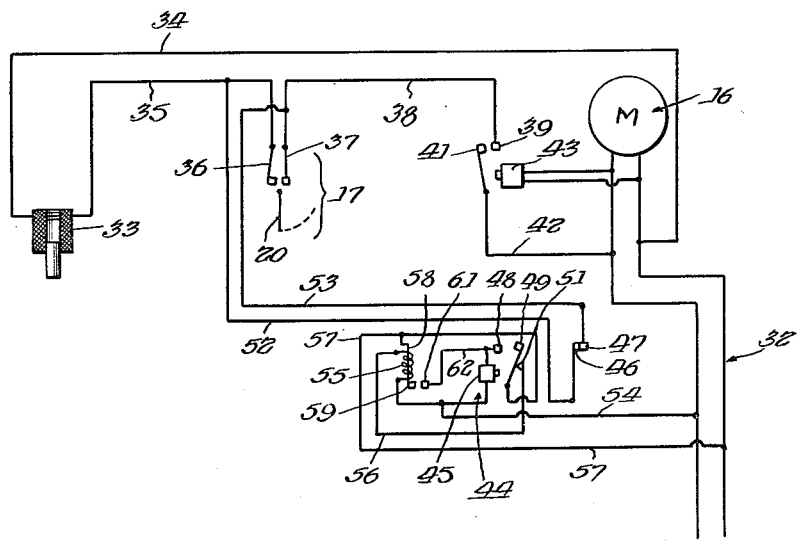
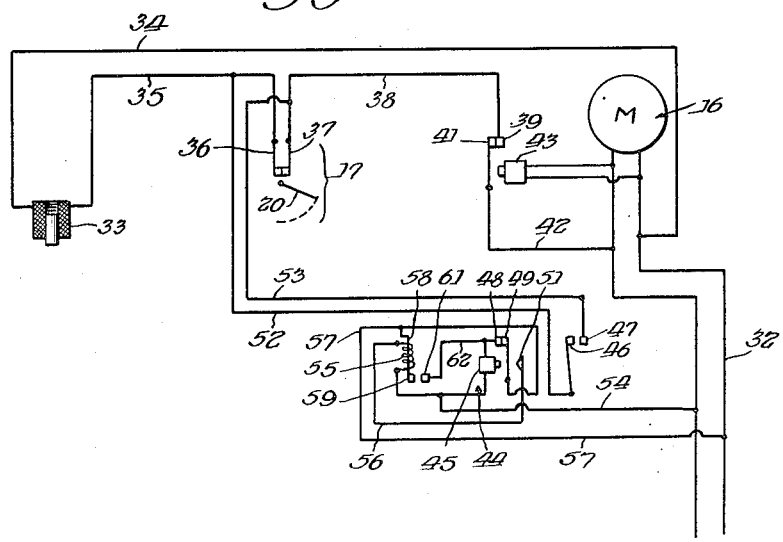

UNITED STATES PATENT OFFICE 2,596,691

SAFETY DEVICE FOR LIQUID SUPPLY SYSTEMS

Frank W. Jackson and Harry M. Nacey, Chicago, Ill.

Application September 3, 1946, Serial No. 694,642

7 Claims. (Cl. 137—78)

The invention relates generally to fluid supply systems, and more particularly to a safety device for preventing a reverse flow and possible contamination of the fluid in such a system.

The invention has among its objects the production of a safety device which will close a fluid supply line whenever the supply flow in the piping ceases, as for example, if a back pressure is built up at the point of fluid use, which back pressure might result in contamination of the fluid supply.

Another object of the invention is the production of such a safety device which may be operated in conjunction with equipment receiving its supply of fluid from such a system, whereby whenever such equipment is shut down the fluid supply line thereto is closed.

A further object of the invention is to provide such a safety device which is very efficient in its operation for accomplishing the above functions, whereby the use of an open system in conjunction with certain types of equipment, such as air conditioning equipment, as now required by city ordinances in various localities, is eliminated.

A further object of the invention is the production of such a device which is relatively simple in construction, dependable and fool-proof in its operation.

Many other objects and advantages of the construction herein shown and described will be obvious to those skilled in the art from the disclosure herein given.

To this end our invention consists in the novel construction, arrangement and combination of parts herein shown and described, and more particularly pointed out in the claims.

In the drawings, wherein like reference characters indicate like or corresponding parts:

Fig. 1 is a diagrammatic view of a fluid supply system embodying the present invention;

Fig. 2 is a sectional view of a magnetically operated valve used in conjunction with such system;

Fig. 3 is a sectional view through a portion of the supply piping illustrating the flow actuated device thereon;

Fig. 4 is a diagram of the electrical circuit employed in the present invention with the operating elements thereof in an off or inoperative position, and Fig. 5 is a diagram of the circuit illustrated in Fig. 4 with the elements thereof in an on or operative position.

In the past, as a result of city ordinances in numerous, if not most localities, the connection of certain forms of equipment to municipal water supply systems have required an open connection between such equipment and the water supply source. For example, in the case of air conditioning systems which oftentimes utilize a flow of water through a heat exchange condenser, operative to condense the refrigerant, it has been required that there be no direct connection from municipal water supply systems to such condenser. This requirement generally necessitates the use of a supply tank into which the water supply is directed at a point above the normal water level in the tank, means being provided to supply additional water only when the level thereof in the tank falls below a predetermined point, and as the condenser is supplied with water from the tank, should any back pressure result in the line between the tank and the condenser, such pressure will not be transmitted to the municipal water supply line. Obviously, with some types of equipment it is necessary to maintain a relatively large supply of water, thereby requiring considerable tankage capacity.

It will be apparent that in the case of a refrigerating system where toxic gases may be employed as the refrigerant, should a leak occur in the condenser between the refrigerant conducting tubes and the water passages, such toxic gas, which is under relatively high pressure, may be forced back through the supply line, and if the water supply were connected directly to the condenser, such toxic gases might possibly be forced back into the water mains and thereby contaminate the supply.

The present invention permits a direct connection of the water supply line to a refrigerant condenser or other equipment, with no possibility of the flow in the water supply line being reversed and possible contamination of the supply. This result is accomplished by employing a flow responsive device to control a valve in the supply line, whereby such valve will be open only during normal flow in the supply line, so that in the event such flow ceases the valve will immediately be closed and thereby seal the water supply main from the condenser or other equipment.

Referring to Fig. 1, I indicates a portion of a water supply main having a feeder pipe 2 connected thereto which passes through the wall 3 into the building to which water is to be supplied and connected to the usual water meter pipe and valve network, the latter in the construction illustrated in Fig. 1 comprising a water meter 4 shunted by a by-pass pipe 5, gate valves 6, 7, 8 and 9 being insered in the piping in the usual manner. Also inserted in the by-pass piping 5 is the usual type of check valve 10. In the construction illustrated, the by-pass piping 5 and check valve 10 permit a predetermined amount of water to flow without actuation of the water meter, the latter being subsequently actuated by an increase in water flow above the predetermined amount permitted by the check valve 10.

For illustrative purposes the outlet 11 of the water meter 4 and by-pass piping 5 is shown as connected to a condenser 12 of an air conditioning or refrigerating system by piping indicated in general by the numeral 13, the normal flow of water from the outlet 11 being through piping 13, condenser 12, and discharged through piping 14 to an open drain indicated generally by the numeral 15. The refrigerant from the air conditioning or refrigerating system may be pumped through the condenser by an electric motor indicated generally by the numeral 16. Interposed in the piping 13, between the outlet 11 and the condenser 12 is a flow switch indicated generally by the numeral 17 and a valve indicated generally by the numeral 18 adapted to be controlled by the flow switch 17. Also interposed in the supply line between the outlet 11 and condenser 12 are a check valve 19 of standard construction, a gate valve 21 and a pressure responsive valve 22. The use of these valves is standard practice in installations of the present type, the valve 22 acting to limit the pressure of the water entering the condenser 12.

The flow switch 17 may be of any suitable construction to achieve the desired results, that illustrated being constructed as shown and described in United States Letters Patent Number 2,238,327, dated April 15, 1941, the details of which form no part of the present invention.

The flow switch 17 is provided with a paddle or vane 20 positioned in the fluid supply line and adapted to be moved by the normal flow of fluid therein as indicated in dotted lines in Fig. 3. The device is so constructed that under a normal flow of fluid, electrical contacts will be closed for completing an electrical circuit, but when the flow stops or reverses, the vane 20 will return to the position illustrated in Fig. 3 and thereby open such contacts and break the electrical circuit.

Likewise, the valve 18 illustrated is of a commercially procurable type, namely, a Davis No. 93H solenoid valve, manufactured by the Davis Regulator Co. Briefly, this valve comprises a housing 23 having an inlet port 24 and outlet port 25 connected through a valve port 26 normally closed by a valve member 27 which may be engaged by a compression spring 27'. The inlet port 24 communicates with the chamber 28 above the valve member 27 through a passageway 29, thus permitting the fluid supply pressure to act upon the top of the valve member 27 and thereby normally maintain the same in a closed position. The chamber 28 communicates with a discharge pipe 29' through a solenoid actuated pilot valve indicated generally by the numeral 31, so that when the valve 31 is closed, pressure will be built up in the chamber 28 to maintain the valve member 27 in its closed position, but by opening the valve 31 the pressure is relieved in the chamber 28 faster than it is supplied through the by-pass 29, whereby the main valve member 27 is fully opened by the initial pressure acting under the same.

Figs. 4 and 5 illustrate one form of electrical circuit that may be utilized, Fig. 4 illustrating the circuit in an inoperative position when there is no demand for the flow of fluid in the supply piping, and Fig. 5 illustrates the same circuit operating under a demand for fluid.

The operation of the flow switch 17 and valve 18 may be related to the operation of the air conditioning or refrigerating system or other equipment to which the fluid supply is connected, whereby valve 18 will remain closed when such equipment is shut down. The electrical circuit is such that when the equipment is initially started up the valve 18 will be initially opened independently of the flow switch 17 and will be maintained open for a relatively short period to initially create a fluid flow to the equipment being supplied, and at the end of such short time interval, which is just sufficient to insure that flow is established, control of the valve 18 is shifted to the flow switch 17 which then maintains sole control over the valve 18 while there is a demand for the flow of fluid in the piping.

Referring to Fig. 4, the motor 16, which for illustrative purposes may be assumed to be the compressor motor of an air conditioning system adapted to drive a pump for circulating the coolant through the condenser 12, is connected to an electrical power line indicated generally by the numeral 32, which in the case of large motors may be three phase utilizing three conductors instead of two. The control of the motor 16 may be achieved by suitable switches in the power line 32, actuated manually or otherwise.

The winding 33 of the pilot valve 31 which controls the action of the valve 18 is operatively connected to one side of the power line 32 by a conductor 34, the other side of the solenoid winding being connected by a conductor 35 to the contact 36 on the flow switch 17. The other contact 37 of the flow switch 17 is connected by a conductor 38 to a contact 39. Cooperating with the contact 39 is a second contact 41 connected to the other side of the power line by a conductor 42. The contacts 39 and 41 are adapted to be closed by a solenoid 43 operatively connected to the power line. Thus, when current is flowing in the power line 32 and the motor 16 operating, the solenoid 43 will be energized to close contacts 39 and 41. The contacts 36 and 37 are opened and closed by movement of the vane 20, the contacts being open in the absence of a fluid flow, as illustrated in Fig. 4.

It will be apparent that with the circuit thus far described, as contacts 36 and 37 are normally open when the valve 18 is closed and winding 33 deenergized, means must be provided for initially energizing the winding 33 and opening the valve 18 when the motor 16 is initially started up. To accomplish this function a thermo-retard or time delay relay is provided which will initially energize the winding 33 and open the valve 18 when power is applied to the motor 16. The relay 44 comprises a winding 45 adapted to actuate a pair of contacts 46 and 47 and the contacts 48, 49 and 51. The contacts 46 and 47 are normally closed contacts and are connected by conductors 52 and 53 to the contacts 36 and 37, respectively, of the flow switch 17. The movable contact 49 normally engages the contact 51 when the winding 45 is deenergized, and is adapted to engage the contact 48 when the winding 45 is energized. One side of the winding 45 is connected to one side of the power line 32 by a conductor 54, the conductor 54 also connecting one side of the power line with one side of a heating coil 55, the other side of the heating coil 55 being connected by the conductor 56 to the contact 51 of the relay 44. The movable contact 49 of the relay 44 is connected by a conductor 57 to the other side of the power line. The conductor 57 is also connected through a bi-metallic arm 58 to a contact 59, contact 61 cooperable with the contact 59 being connected by a conductor 62 to the other side of the winding 45 and contact 48. The coil 55 and bi-metallic arm 58 are so constructed that current flowing through the coil 55 will create sufficient heat to cause movement of the arm 58 and close the contacts 59 and 61, and thereby energize the winding 45. As contacts 57 and 61 are closed as a result of the thermo-action of the coil 55 upon the bi-metallic arm 58, a time delay is provided for the closing of the contacts, this delay depending upon the design of the coil 55 and bi-metallic arm 58 which may be varied to provide a satisfactory delay period. For example, we have found that a delay in the closing of the contacts 59 and 61 of five seconds from the time current starts to pass through the coil 55 provides very satisfactory operation of the circuit. The various elements of this portion of the device are of standard type, commercially procurable, consequently details of their construction forms no part of the present invention.

The operation of the device is as follows:

Assuming the air conditioning or other equipment is inoperative, no current will be flowing in the power line 32, consequently, the various contacts will be in the position illustrated in Fig. 4, the windings 33, 43 and 45 being de-energized and the valve 18 closed. When current flows through the power line 32 as a result of a demand upon the equipment, winding 43 will be energized, thus closing contacts 39 and 41, and as contacts 46 and 47 are normally closed, current will flow from the power line through conductor 34, winding 33 of the pilot valve 31, conductor 52, contacts 46 and 47, conductor 53, conductor 38, contacts 39 and 41 and conductor 42, thus opening the valve 18, at the same time actuating the motor 16. The air conditioning equipment, therefore, begins to operate and at the same time a flow is established through the flow switch 17 in the water supply piping. Simultaneously with the actuation of the motor 16 and the opening of the valve 18, current will flow through the conductor 57, contacts 49 and 51 which are normally closed, conductor 56, coil 55 and conductor 54, and as this current continues to pass through the coil 55, heat will be applied to the bi-metallic arm 58, thereby eventually closing the contacts 59 and 61, this operation requiring approximately five seconds from the time current begins to pass through the coil 55. During this five second interval, water having begun to flow to the condenser 12, the vane 20 will be moved to the position illustrated in Fig. 5, thereby closing the contacts 36 and 37, the five second interval providing adequate time for insuring the closing of these contacts as a result of the water flow. When contacts 59 and 61 close, the winding 45 is energized, current flowing through the conductor 54, winding 45, conductor 62, contacts 61 and 59, arm 58 and conductor 57, whereupon contacts 49 and 51 open and contacts 48 and 49 close, thereby locking in the relay 44 and disconnecting the coil 55 from the circuit. Simultaneously with the actuation of the relay 44, contacts 46 and 47 are opened, the energization of the winding 33 thereafter depending upon the position of the contacts 36 and 37 and the contacts 39 and 41. The position of the various contacts are now as shown in Fig. 5, and it will be apparent that in the event the flow of water to the condenser ceases for any reason, as for example, due to an obstruction in the drain pipe 14, or as a result of leakage between the coolant flowing through the condenser into the water line whereby back pressure might be created, the vane 20 will drop to its position illustrated in Fig. 4, thereby opening the contacts 36 and 37 to de-energize the winding 33 and close the valve 18 to prevent any reverse flow back into the feeder pipe 2 and supply main 1.

In the event current stops flowing in the power line 32 as a result of shut-down of equipment, windings 43 and 45 are de-energized and the entire circuit returns to its original condition as illustrated in Fig. 4, the cycle being repeated upon reactivation of the air conditioning equipment.

Having thus described our invention, it is obvious that various immaterial modifications may be made in the same without departing from the spirit of our invention; hence, we do not wish to be understood as limiting ourselves to the exact form, construction, arrangement and combination of parts herein shown and described, or uses mentioned.

What we claim as new and desire to secure by Letters Patent is:

1. In a fluid supply system, the combination of a supply piping, a valve and a flow operated device in series with said piping, means for initially opening said valve, means operable by said flow operated device for maintaining said valve open during an inflow of fluid in said piping, and closed when such flow ceases, and time delay means actuated by said initial valve opening means for rendering the latter means inoperative after a predetermined period of time subsequent to the opening of said valve.

2. In a fluid supply system, the combination of a supply piping, a valve and a flow operated device in series with said piping, means operable by the flow operated device for maintaining said valve open when the fluid flow is in a predetermined direction and closed when such flow ceases, means for initially opening said valve independently of said flow operated device, and means related to both the means operable by said flow operated device and said initial valve opening means for rendering the latter means inoperative after a predetermined period of time following the opening of said valve.

3. In a fluid supply system, the combination of an electrical control circuit, a supply piping, a pair of normally open contacts, means operable during an inflow of fluid in said piping for closing said contacts, a normally closed electrically controlled valve in said piping adapted to open when electrically energized, a starting relay operatively connected to said electrical control circuit and having a pair of contacts adapted to be closed when said relay is energized, said pairs of contacts being connected in series with the electrical actuating mechanism of said valve and the circuit thus formed being connected in parallel with the electrical control circuit whereby said valve is open during inflow of fluid in said piping and operation of said electrical control circuit, but closed if such inflow of fluid ceases or said control circuit is inoperative, a second relay having a pair of normally closed contacts connected in parallel with said flow actuated contacts, and a second pair of normally open contacts for locking in said relay when once energized, and a time delay relay operatively related to said second relay for actuating the latter after a predetermined period of time following the actuation of said starting relay to open the normally closed contacts of said second relay after the establishment of an inflow of fluid in said piping has closed said flow actuated contacts.

4. In a fluid supply system, the combination of a supply piping, a valve in said piping, a flow operated device in said piping operatively related to said valve for maintaining the latter open when the fluid flow in said piping is in a predetermined direction and closed when such flow ceases, means for initially opening said valve, control means actuatable subsequent to the initial opening of said valve to render said initial valve opening means inoperative, and time delay means related to said control means for retarding actuation of the latter until a desired fluid flow is established, said control means being adapted upon actuation thereof to render said time delay means inoperative.

5. In a fluid supply system, the combination of a supply piping, a valve in said piping, a flow operated device in said piping operatively related to said valve for maintaining the latter open when the fluid flow in said piping is in a predetermined direction and closed when such flow ceases, means for initially opening said valve, time delay means responsive to the actuation of said initial opening means when said valve is opened thereby, and control means related to and initially actuated by said time delay means after a predetermined period of time subsequent to the initial opening of said valve, said control means being operative upon actuation thereof to render said initial valve opening means and said time delay means inoperative.

6. In a fluid supply system for an electrically energized device, the combination of a supply piping for a fluid under pressure adapted to be supplied to the device, an electrical circuit for the control of the fluid supply system and the energization of the device, including an electrically controlled valve and a flow operated device operatively connected to the supply piping and to the electrical circuit, a valve opening electrical circuit including the electrically controlled valve operatively connected to said first mentioned electrical circuit and adapted to be energized upon initial energization of the device, said electrically controlled valve normally biased closed by the pressure of the fluid within the supply piping and adapted to open upon the energization of the device, and means operable by said flow operated device adapted to maintain said electrically controlled valve open during an inflow of fluid in said piping, and closed when said flow ceases, and a control circuit including means operatively connected to the first mentioned electrical circuit and to said circuit for the electrically controlled valve for initially energizing the electrically controlled valve to open it upon the energization of the device and rendering the valve opening circuit inoperative after the establishment of an inflow of fluid in said piping upon the energization of said electrically controlled valve.

7. In a fluid supply system for electrically controlled equipment, the combination of a fluid supply piping for a fluid under pressure adapted to be supplied to the equipment, an electrical circuit for the control of the fluid supply system and the energization of the electrically controlled equipment including an electrically controlled valve and a flow operated device operatively connected in series to the supply piping and operatively connected to the aforesaid electrical circuit, a valve opening electrical circuit including the electrically controlled valve operatively connected to said first mentioned electrical circuit and adapted to be energized upon initial energization of the equipment, said electrically controlled valve normally biased closed by the pressure of the fluid within the supply piping and adapted to open upon the energization of the equipment, an electrical circuit controlled by said flow operated device adapted to maintain said electrically controlled valve open during an inflow of fluid in said piping and the operation of such equipment, and closed if such inflow ceases or such equipment is inoperative, and a control circuit including means related to said circuits for the electrically controlled valve and flow operated device for rendering the valve opening electrical circuit inoperative after the establishment of an inflow of fluid in said piping upon the energization of said electrically controlled valve.

FRANK W. JACKSON.
HARRY M. NACEY.

REFERENCES CITED

The following references are of record in the file of this patent:

UNITED STATES PATENTS

| Number | Name | Date |
|---|---|---|
| 548,288 | Beattie | Oct. 22, 1895 |
| 891,563 | Runnion | June 23, 1908 |
| 1,177,001 | Willour | Mar. 28, 1916 |
| 1,284,197 | Larner et al. | Nov. 5, 1918 |
| 1,338,638 | Knell | Apr. 27, 1920 |
| 1,813,719 | White | July 7, 1931 |
| 2,290,047 | Hildebrecht | July 14, 1942 |